US012292755B2

(12) United States Patent
Pandey

(10) Patent No.: US 12,292,755 B2
(45) Date of Patent: May 6, 2025

(54) FAST POWER-UP SCHEME FOR CURRENT MIRRORS

(71) Applicant: TEXAS INSTRUMENTS INCORPORATED, Dallas, TX (US)

(72) Inventor: Saurabh Pandey, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 252 days.

(21) Appl. No.: 17/966,253

(22) Filed: Oct. 14, 2022

(65) Prior Publication Data

US 2023/0418321 A1 Dec. 28, 2023

(30) Foreign Application Priority Data

Jun. 27, 2022 (IN) ............................ 202241036661

(51) Int. Cl.
*G05F 3/26* (2006.01)

(52) U.S. Cl.
CPC .................................... *G05F 3/262* (2013.01)

(58) Field of Classification Search
CPC ........................................................ G05F 3/262
See application file for complete search history.

(56) References Cited

U.S. PATENT DOCUMENTS 5,969,549 A * 10/1999 Kim ........................ G11C 5/143 327/143
6,052,006 A * 4/2000 Talaga, Jr. ........... H03K 17/223 327/143
11,966,246 B2 * 4/2024 Chiang ................... G05F 3/262
2005/0174099 A1 * 8/2005 Ohkubo ................ H03M 1/745 323/315
2007/0210858 A1 * 9/2007 Ang ........................ G05F 3/262 327/543
2021/0242772 A1 * 8/2021 Nomura ................ H02M 3/155
2022/0247354 A1 * 8/2022 Hu .......................... H03K 4/502
2023/0223847 A1 * 7/2023 Wu ......................... H02M 1/08 323/282

FOREIGN PATENT DOCUMENTS

JP 2005191036 A * 7/2005 ............ H03M 1/745

* cited by examiner

*Primary Examiner* — Sisay G Tiku
(74) *Attorney, Agent, or Firm* — Brian D. Graham; Frank D. Cimino

(57) ABSTRACT

An automatic charge/discharge circuit is presented that allows a current mirror circuit with a high capacitance to quickly and automatically charge or discharge the capacitance in order to allow for a fast start-up power supply. The charge/discharge circuit automatically stops charging or discharging as the voltage on the capacitance approached a desired steady state.

18 Claims, 5 Drawing Sheets

FAST POWER-UP SCHEME FOR CURRENT MIRRORS

BACKGROUND

Power supplies are used in all areas of electronics. In many cases, a type of current mirror is employed. In a current mirror, the current in one branch of a circuit can be automatically controlled, at least partially, by the current in a different branch of the circuit. The actual circuits necessary to create a current mirror can be very simple, and power can be supplied to multiple different circuits through this technique. Depending on the number and type of circuits to which power is supplied by the current mirror, the combination of circuits can create a capacitance that serves to slow down start-up power supplied by the current mirror. By automatically discharging the charge related with this capacitance, the start-up delay can be reduced.

SUMMARY

A power circuit implementing a fast power-up scheme for current mirrors is presented herein. The power circuit includes a first current mirror circuit with first and second current paths. The current through the first current path is used to control the current through the second current path. The power circuit further includes a second current mirror circuit, with third and fourth current paths, with the current passing through the third current path used to control the current passing through the fourth current path. The second and third current paths are aligned such that a majority of the current passing through the second current path is the same as a majority of the current passing through the third current path. The power circuit further includes an automatic discharge configured to enable fast start-up of the current through the third and fourth current paths.

An additional fast power-up power circuit is further disclosed that includes a first current mirror circuit. The first current mirror circuit includes a first current path passing through a p-type Field Effect Transistor (FET) and a second current path passing through a second p-type FET and a first n-type FET. The current mirror circuit is configured to control the current in the second current path based at least in part on the current passing through the first current path. The power circuit further includes a second current mirror circuit, which includes the second current path and a third current path passing through a second n-type FET. The second current is configured to control the third current passing through the third current path. The third current provides power to a feed circuit. The power circuit also includes an automatic discharge configured to enable fast start-up of the third current.

A system is also disclosed that comprises a power source which feeds a feed circuit. The power circuit and feed circuit combine to present a capacitance. The power source includes an enable switch configured to allow the power source to provide power to the feed circuit when the enable switch is enabled. The power source further includes a discharge circuit which is configured to discharge a charge associated with the capacitance when the enable switch is enabled. The discharge circuit automatically creates a connection with a discharge source when the enable switch is enabled and automatically disconnects the connection with the discharge source when the charge is sufficiently discharged such that a provision of power to the feed circuit is not limited based on the capacitance.

BRIEF DESCRIPTION OF THE DRAWINGS

Embodiments of the present technology will be described and explained through the use of the accompanying drawings in which.

Figure 1:
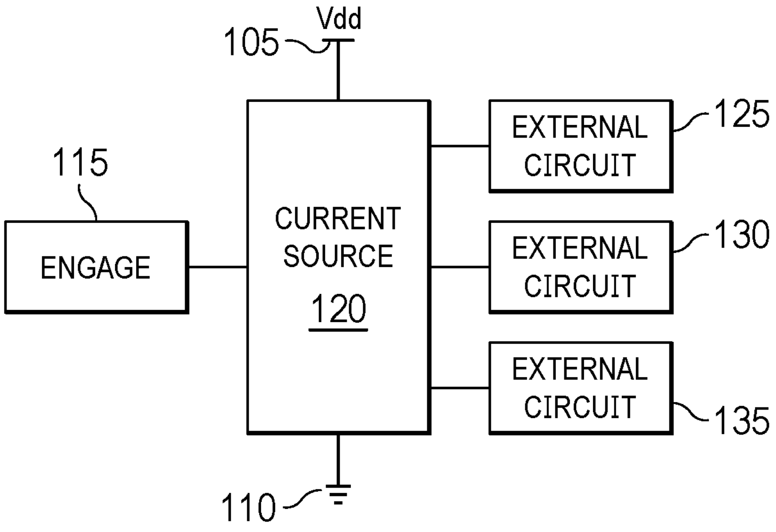
FIG. 1 is a block diagram of an implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A system diagram of an implementation is shown in FIG. 1. Circuits 125, 130 and 135 are shown. While three circuits 125, 130 and 135 are shown, the system 100 could include any number of circuits. These circuits may be independent circuits, physically separated from the other elements of system 100. If the circuits are physically separated, then they may still be electrically connected, such as by wire, to at least some of the remaining elements of system 100. Circuits 125, 130 and 135 may alternately be physically combined with one or more of the remaining elements of system 100. For example, circuits 125, 130 and 135 may be on the same circuit board as the remaining elements of system 100, or, alternatively, circuits 125, 130 and 135 may be a part of the same integrated circuit as one or more of the remaining elements of system 100. Circuits 125, 130 and 135 are connected to current source 120 to draw power. This connection may be accomplished through wires, metallic traces, wirelessly, or any other way. The current source 120 may supply the same or similar current to each of circuits 125, 130 and 135, or current source 120 may be configured to supply power differently to one or more of circuits 125, 130 or 135. This difference may be manually configured, or may be automatic. For example, current source 120 may include a current mirror device that controls the current supplied to circuits 125, 130 and 135. Circuit 125 may require a large amount of power at the provided current rate, while circuit 130 may only require a small amount of power at the provided current rate. By controlling the current through the current mirror device in current source 120, current source 120 can automatically control the power supplied to circuits 125 and 130. Current source 120 is further attached to power supply 105, ground 110 and enable switch 115. Power supply 105 may be any source of power, such as a battery or line voltage. Power supply 105 may be physically located with the other elements of system 100, or may be remote to the other elements. Ground 110 may be a physical connection to an earth ground, or may be a local ground within a circuit. Ground 110 may be one of several separate common grounds within a circuit, and may or may not be associated with an actual earth ground. Ground 110 may be a common ground relative to other elements of system 100. Enable switch 115 is connected to system 100 and enables power to be supplied to circuits 125, 130 and/or 135 when it is enabled. Enable switch may be an actual switch. In an embodiment, enable switch may be a transistor that allows current flow when a voltage is applied to the transistor. Current source 120 can be any type of current source capable of supplying power to circuits 125, 130 and 135. For example, current source 120 may be configured as current source 200, shown in FIG. 2, current source 300, shown in FIG. 3, or current source 400, shown in FIG. 4. Many other implementations are also possible.

Figure 2:
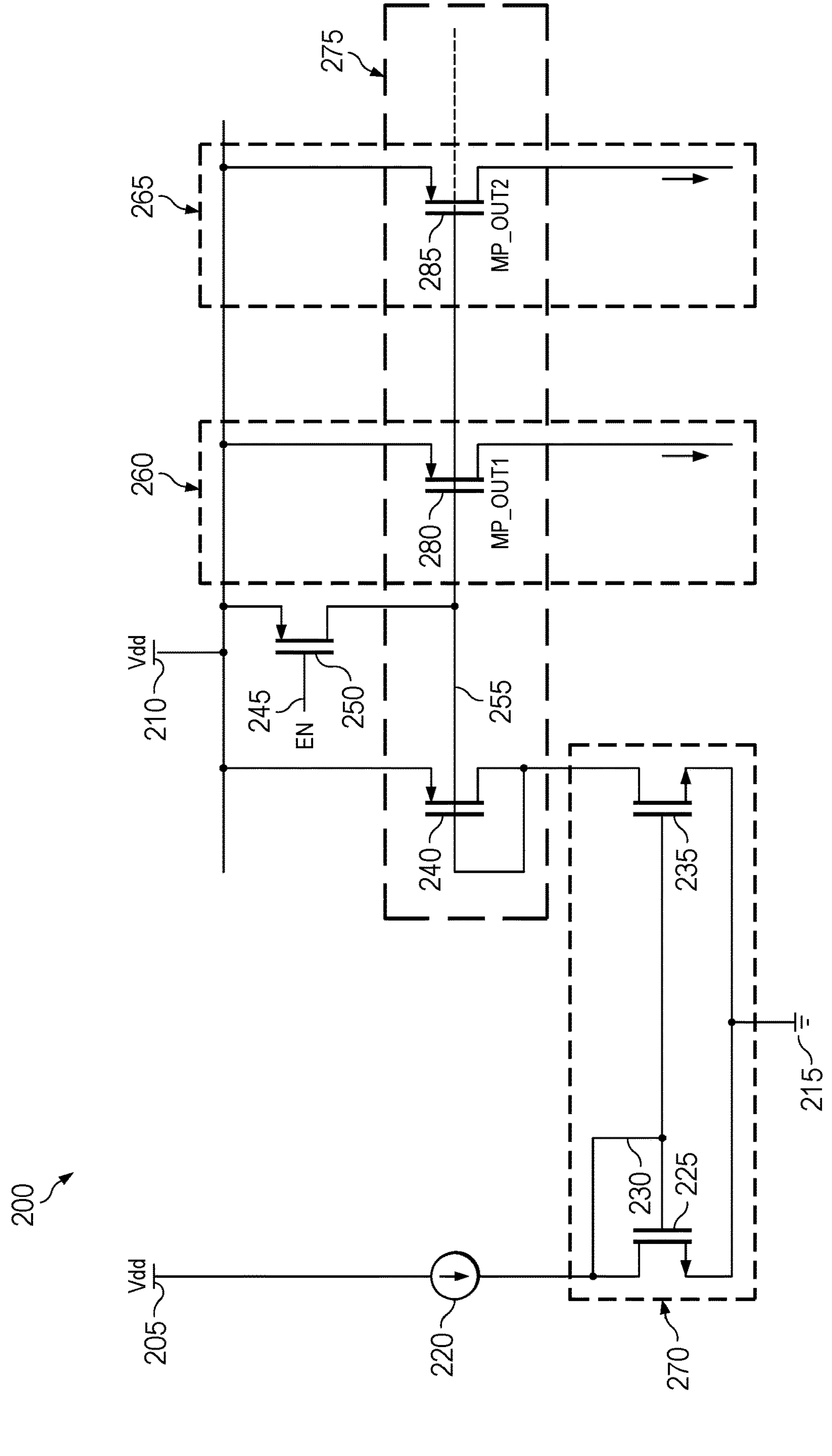
FIG. 2 is a schematic diagram of a current mirror.

FIG. 2 illustrates an implementation of a current source 200. Current source 200 shows a voltage supply node 205 and voltage supply node 210. Voltage supply nodes 205 and 210 may be the coupled to the same power source, or may be coupled to different sources providing substantially similar voltages. Each of voltage supply node 205 and 210 may be coupled to a power source, such as a battery or other voltage source. Ground node 215 is also shown. As described above, ground may be a reference to an actual earth ground, or a circuit ground, common or otherwise. Various transistors, such as bias FET 225, output FET 235, bias FET 240, enable FET 250, output FET 280 and output FET 285 are shown. While these elements are shown as FETs, it should be understood that they could also be implemented with bipolar junction transistors (BJTs) or insulated-gate bipolar transistors (IGBTs), or any other circuit element capable of providing a similar effect. Similarly, while a particular arrangement of p-type and n-type FETs is shown, one of ordinary skill in the art should recognize that a different arrangement of n-type and p-type FETs or bipolar junction transistors could be used to achieve the same or similar results. The description of particular arrangements is not meant to limit this disclosure to those arrangements disclosed. Rather, the particular arrangements are described in order to properly convey the ideas presented herein.

A FET is a type of transistor that uses an electric field to control the flow of current in a semiconductor. An n-type FET uses allows flow of electrons between the source and drain terminals when a gate terminal in enabled. A p-type FET allows flow of holes between the source and drain terminals when the gate terminal is enabled. These distinctions, along with many others, can be used by one of ordinary skill in the art to design a well-functioning current source.

In current source 200, two n-type FETs, bias FET 225 and output FET 235 are utilized to create a first current mirror circuit, shown as outline 270. Connection 230 connects the drain terminal of bias FET 225 with the gate terminal of bias FET 225 and the gate terminal of output FET 235. The gate terminals of bias FET 225 and output FET 235 control the current allowed through bias FET 225 and output FET 235. Thus, by connecting the gate terminals together, bias FET 225 and output FET 235 are configured to allow corresponding current flows through the corresponding circuit branches. If bias FET 225 and output FET 235 are identical in construction, then the current allowed through each branch of the circuit would be identical. In some cases, bias FET 225 and output FET 235 may be different from each other. By way of example, in some cases, the width of the channel in output FET 235 may be twice the width of the channel in bias FET 225, allowing the current through output FET 235 to be controlled at twice the current through bias FET 225. By connecting the drain terminal of bias FET 225 to the gate terminals of bias FET 225 and output FET 235, the current allowed through output FET 235 can be tied to the actual current passing through bias FET 225. This allows a target current (provided by current source 220) to be used to control the current allowed through output FET 235.

Current source 200 includes a second current mirror circuit, shown as outline 275. Bias FET 240, output FET 280 and output FET 285 are electrically connected at the gate terminals, comprising gate node connection 255. Bias FET 240, output FET 280 and output FET 285 are shown as p-type FETs, but one of skill in the art would understand that, with different design considerations, these all the transistors shown and discussed herein may be replaced with different types of transistors. As described in regard to the first current mirror, this connection allows a correlated amount of current to pass through each of bias FET 240, output FET 280 and output FET 285. Assuming that bias FET 240, output FET 280 and output FET 285 are identical, the current allowed through each branch of the current mirror will be identical. If bias FET 240, output FET 280 and output FET 285 vary in geometry, then the current allowed through each branch is related and proportional based on the geometry. For example, if the geometry (e.g. gate/channel width) of bias FET 240 and output FET 280 are identical, but the channel width in output FET 285 is twice as wide, then the current allowed through bias FET 240 and output FET 280 will be identical, while the current allowed through output FET 285 will be double that of bias FET 240 and output FET 280.

In the case of the current mirror circuit shown in outline 275, p-type FETs are shown. One of ordinary skill in the art will understand that these FETs could be redesigned to be n-type FETs, BJTs, IGBTs, or some other circuit element with similar behavior. The drain of bias FET 240 is connected to the gates of bias FET 240, output FET 280 and output FET 285. The current passing through bias FET 240 is the target current for the current mirror shown in outline 275. This current allowed through FET 280 and 285 are correlated to this target current. In an implementation, the current passing through output FET 235 is virtually identical to the current passing through bias FET 240. Thus, the target current provided by current source 220 can be used to provide a target current for output FET 235, output FET 280 and output FET 285. As discussed above, the target current for each of the output FETs may be identical to or proportional to the target current provided by current source 220.

Current source 200 also includes an additional enable FET 250. Enable FET 250 operates as an enable switch, and the gate of FET 250 is connected to an enable terminal 245. Providing a logic high signal to the enable terminal 245 has the effect of turning off FET 250, allowing the voltage on the gate node connection 255 to adjust and thereby normalize the current through bias FET 240, output FET 280, and output FET 285. In this way, the second current mirror shown in outline 275 is enabled, or turned on. Likewise, when a logic low signal is provided to the enable terminal 245, FET 250 is turned on, which pulls the voltage on the gate node connection 255 high and turns bias FET 240, output FET 280, and output FET 285 off. Accordingly, output branches 260 and 265 of the second current mirror shown in outline 275 will not provide power to the circuits. When enable terminal 245 is supplied a logic high signal, the current mirror will begin to provide power to the circuits attached to output branches 260 and 265.

FIG. 2 shows 2 output branches 260 and 265. The number of output branches is not limited to two. Current source 200 could be arranged to provide power to any number of output branches. When many output branches are connected as part of current source 200, the capacitance on the gate node connection 255 can be large. Additionally, depending on the particular circuits attached to the output branches, the capacitance at the gate node connection 255 can be large even with relatively few branches.

The capacitance at gate node connection 255 impedes the current mirror shown in outline 275 from starting up quickly when the voltage at the enable terminal 245 rises. For example, the voltage level at the gate node connection 255 may be at or near to the voltage level of voltage supply node 210 when enable terminal 245 is supplied with a logic low signal. Theoretically, when enable terminal 245 is switched to a logic high signal, current begins to flow through output branches 260 and 265. However, in light of the capacitance at gate node connection 255, minimal current will flow through enable FET 250 until the charge at gate node connection is discharged. This discharge occurs through current passing through output FET 235 to ground 215. In an embodiment, output FET 235 is sized to correlate to bias FET 225 in order to create the current mirror shown in outline 270. The size of output FET 235 limits the speed at which the charge at gate connection node 255 can discharge, thus delaying the introduction of current to output branches 260 and 265. In an implementation, the voltage level of gate node connection 255 will eventually discharge to approximately 1 volt less than voltage supply node 210 when the enable terminal 245 is at a logic high. One of ordinary skill in the art will understand that ordinary design considerations can be used to adjust this voltage as desired.

Figure 3:
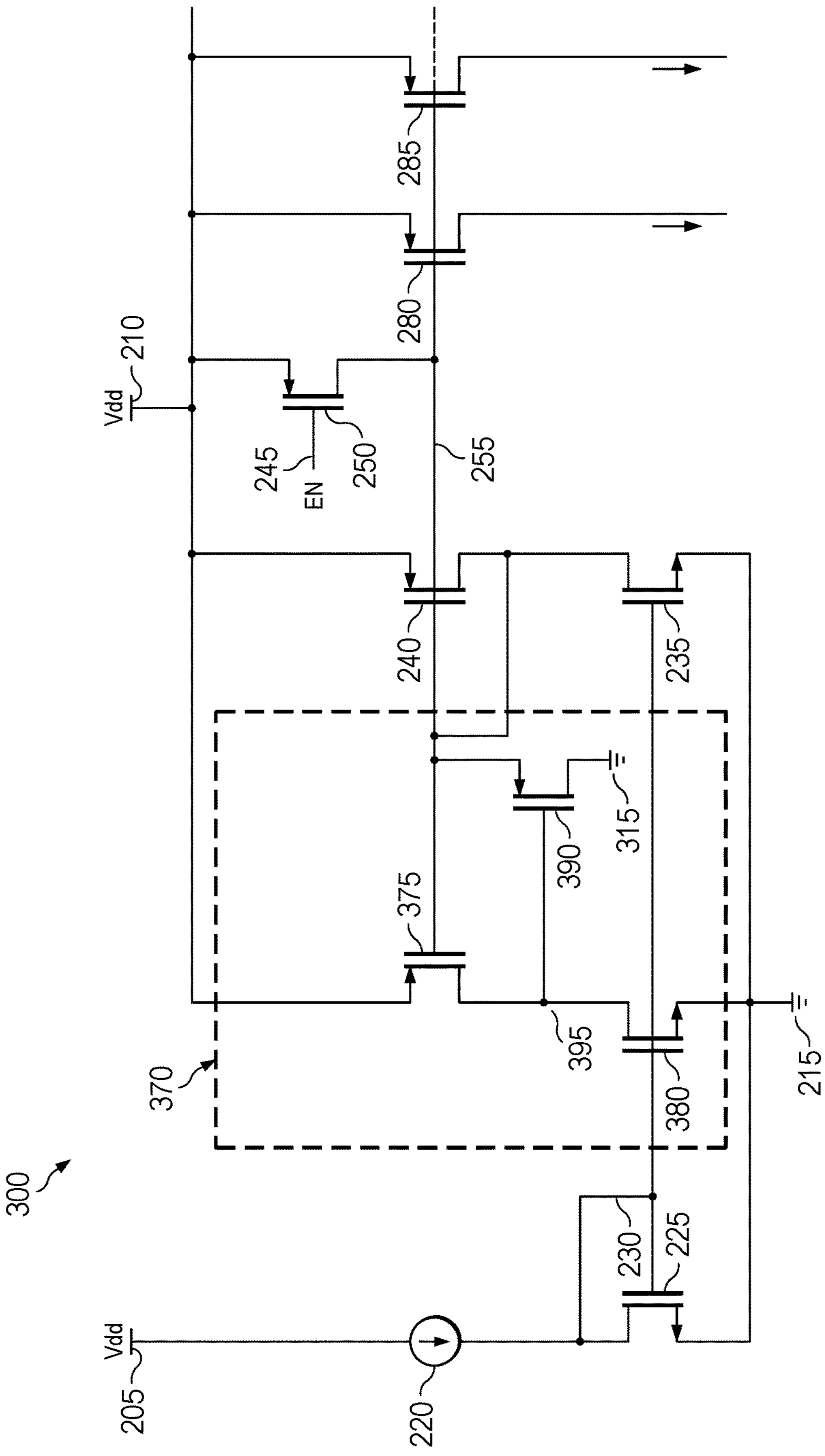
FIG. 3 is a schematic diagram of an implementation.

Turning to FIG. 3, current source 300 is shown, in which an automatic discharge circuit 370 has been added to the circuit of FIG. 2. The elements discussed above in FIG. 2 are duplicated with the same element numbers in FIG. 3 for convenience. Discharge FET 390 is attached to the gate node connection 255 at the source, and to ground 215 at the drain. Discharge FET 390 can act to discharge the charge on gate node connection 255 by allowing current to flow to ground 215. Discharge FET 390 can function somewhat similarly to a switch or a variable resistor with the gate providing an input which determines whether the switch is open or closed (in the case of the switch), or what the resistance will be (in the case of the variable resistor).

In an implementation, when enable terminal 245 is low, the gate node connection 255 is at or near to the voltage of voltage supply node 310. When enable terminal 245 is made high, initially the current through sense FET 375 is very low (at least until the charge at the gate node connection 255 discharges). The voltage at trigger 395, which can correspond to the gate of sink FET 390 is therefore low, allowing current to flow from gate node connection 255 to ground node 315. Ground node 315 may be the same as ground node 215, or may be separate. One or both of ground node 315 and ground node 215 may be connected to earth ground, a common ground, or another drain. Discharge FET 390 is not limited to a certain dimension as output FET 235 is, for example. Therefore, discharge FET 390 can be selected with dimensions that will allow quick discharge of gate node connection 255. As gate node connection 255 discharges, the current allowed through sense FET 375 increases, increasing the voltage presented to trigger 395. Thus, the current allowed through discharge FET 390 will be gradually reduced, and essentially blocked as gate connection node 255 approaches full discharge.

The geometry of the various FETs discussed above can be selected to accommodate various circuit requirements. In an implementation, the geometries of various elements of automatic discharge 370 are selected to allow the gate node connection 255 to quickly and automatically discharge when the enable terminal is powered. Further, the geometries can be selected such that the voltage at trigger 395 stays at or near the voltage of voltage supply node 210 when the circuit is in steady state after power up. In this way, the current flow from gate node connection 255 to ground 315 remains off. In an implementation, this can be accomplished by sizing reference FET 380 and sense FET 375 appropriately. By way of example, reference FET 380 can be sized in reference to output FET 235, such that ratio of the width of the channel of reference FET 380 to the width of the channel of output FET 235 is 1:N. Similarly, sense FET 375 can be sized such that the ratio of the width of the channel of sense FET 375 to the width of the channel of bias FET 240 is 1:P. By keeping N greater than P, the voltage at trigger 395 will be drawn to or near to the voltage of voltage supply node 210 in steady state after power up.

Figure 4:
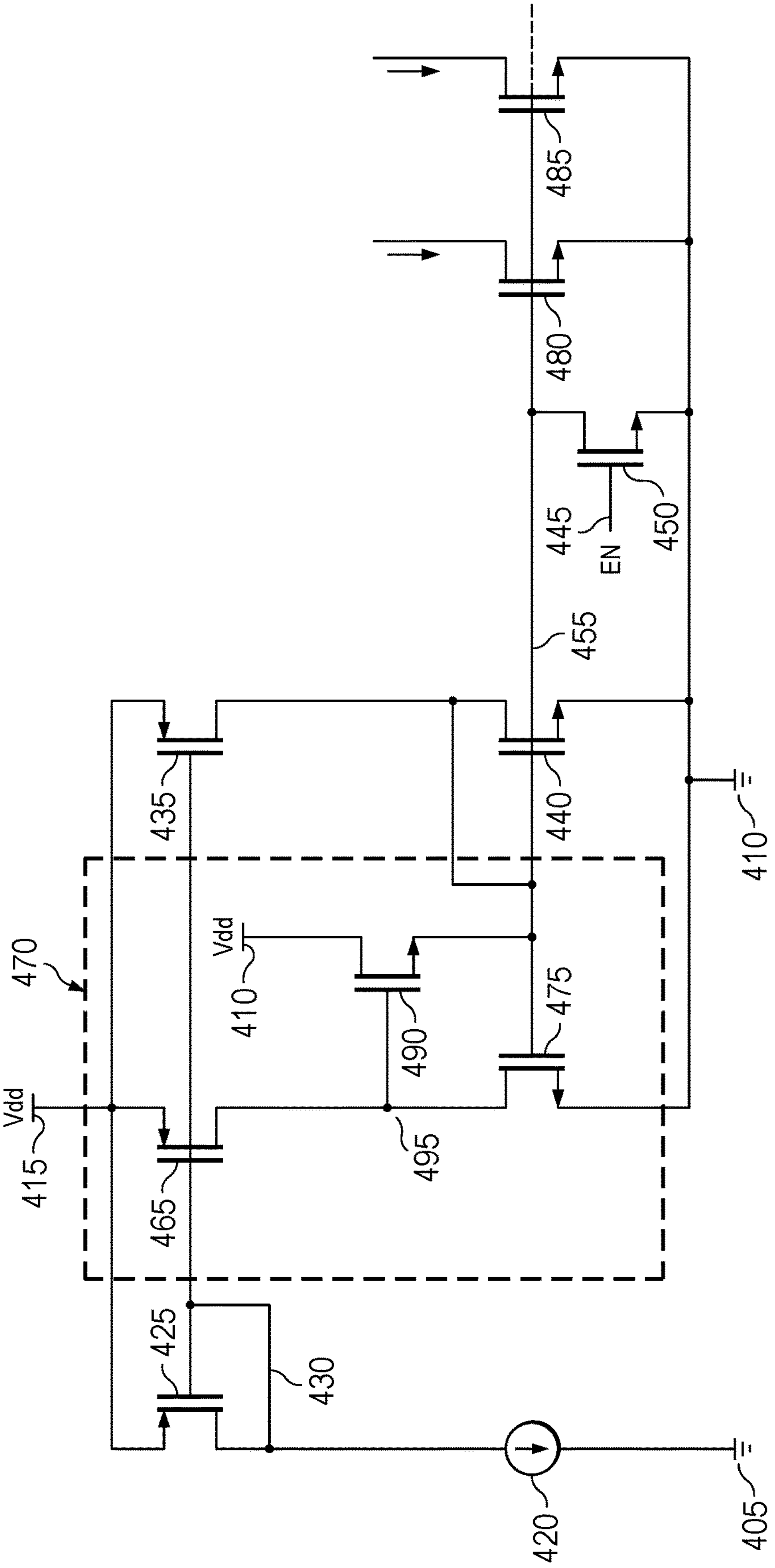
FIG. 4 is a schematic diagram of an implementation.

FIG. 4 illustrates another implementation of a current source 400 with an automatic discharge system. Current source 400 shows a ground node 405 and ground node 410. Ground 405 may be coupled to the same as ground 410, or may be coupled to a separate ground with substantially similar voltage. One or both of ground node 405 and ground node 410 may be connected to earth ground, a common ground, or another drain. Voltage supply nodes 415 and 416 are also shown. Voltage supply nodes 415 and 416 may be coupled to the same power source, or may be coupled to different sources providing substantially similar voltages. Each of voltage supply node 415 and 416 may be coupled to a power source, such as a battery or other voltage source. Various transistors are shown as FETs in FIG. 4. While these elements are shown as FETs, it should be understood that they could also be implemented with bipolar junction transistors (BJTs) or insulated-gate bipolar transistors (IGBTs), or any other circuit element capable of providing a similar effect. Similarly, while a particular arrangement of p-type and n-type FETs is shown, one of ordinary skill in the art should recognize that a different arrangement of n-type and p-type FETs or bipolar junction transistors could be used to achieve the same or similar results, depending on the design constraints. The description of particular arrangements is not meant to limit this disclosure to those arrangements disclosed. Rather, the particular arrangements are described in order to properly convey the ideas presented herein.

In current source 400, two p-type FETs, bias FET 425 and output FET 435 are utilized to create a first current mirror circuit. Connection 430 connects the drain terminal of bias FET 425 with the gate terminal of bias FET 425 and the gate terminal of output FET 435. The gate terminals of bias FET 425 and output FET 435 control the current allowed through bias FET 425 and output FET 435. Thus, by connecting the gate terminals together, bias FET 425 and output FET 435 are configured to allow corresponding current flows through the corresponding circuit branches. If bias FET 425 and output FET 435 are identical in construction, then the current allowed through each branch of the circuit would be identical. In some cases, bias FET 425 and output FET 435 may be different from each other. By way of example, the width of the channel in output FET 435 may be twice the width of the channel in bias FET 425, allowing the current through output FET 435 to be controlled at twice the current through bias FET 425. By connecting the drain terminal of bias FET 425 to the gate terminals of bias FET 425 and output FET 435, the current allowed through output FET 435 can be tied to the actual current passing through bias FET 425. This allows a target current 420 to be used to control the current allowed through output FET 435.

Current source 400 includes a second current mirror circuit, created from bias FET 440, output FET 480 and output FET 485, which are electrically connected at the gate node connection 455. Bias FET 440, output FET 480 and output FET 485 are shown as n-type FETs, but one of skill in the art would understand that, with different design considerations, these all the transistors shown and discussed herein may be replaced with different types of transistors. This connection allows a correlated amount of current to pass through each of bias FET 440, output FET 480 and output FET 485. Assuming that bias FET 440, output FET 480 and output FET 485 are identical, the current allowed through each branch of the current mirror will be identical. If bias FET 440, output FET 480 and output FET 485 vary in geometry, then the current allowed through each branch could vary. For example, If the geometry of bias FET 440 and output FET 480 are identical, but the channel in output FET 485 is only half as wide, then the current allowed through bias FET 440 and output FET 480 will be identical, while the current allowed through output FET 485 will be only half that amount.

The drain of bias FET 440 is connected to the gates of bias FET 440, output FET 480 and output FET 485. The current passing through bias FET 440 is the target current for the current mirror. This current allowed through FET 480 and 485 are correlated to this target current. In an implementation, the current passing through output FET 435 is virtually identical to the current passing through bias FET 440. Thus, the target current 420 can be used to provide a target current for output FET 435, output FET 480 and output FET 485. As discussed above, the target current for each of the output FETs may be identical to or proportional to target current 420.

Current source 400 also includes enable FET 450. Enable FET 450 operates as an enable switch, and the gate of FET 450 is connected to an enable terminal 445. By providing an input to the enable terminal 445, the second current mirror is enabled, or turned on, providing power to external circuits through output FET 280 and output FET 285. It should be understood that many more output FETs which are not shown could also be utilized to provide power to many external circuits. In an embodiment, when enable terminal 445 is turned off, output FET 480 and output FET 485 will not provide power to the circuits. When enable terminal 445 is turned on, the current mirror will begin to provide power to the circuits attached to output FET 480 and output FET 485. It should be understood that in an implementation, turning on enable terminal 445 comprises reducing the voltage level of enable terminal to at or near that of ground 410.

Current source 400 could be arranged to provide power to any number of external circuits through output FETs. When many external circuits are connected to current source 400, the capacitance on the gate node connection 455 can be large. Additionally, depending on the particular circuits attached to the output FETs 480 and 485, the capacitance at the gate node connection 455 can be large even with relatively few branches.

The capacitance at gate node connection 455 impedes current source 400 from starting to provide power to external circuits quickly. For example, the voltage level at the gate node connection 455 is at or near to the voltage level of ground 410 when enable terminal 445 is provided a logic high signal, allowing current through enable FET 450. Theoretically, when enable terminal 445 is switched to a logic low signal, enable FET 450 is turned off, allowing the voltage on the gate node connection 455 to adjust and thereby normalize the current through bias FET 440, output FET 480 and output FET 485. In this way, current begins to flow through output FET 480 and output FET 485. However, in light of the capacitance at gate node connection 455, minimal current will actually flow through sense FET 475 until gate node connection is charged. This charging occurs by current passing through output FET 435 from voltage supply node 415. In an embodiment, output FET 435 is sized to correlate to bias FET 425 in order to create a current mirror. The size of output FET 435 limits the speed at which the gate connection node 455 can charge, thus delaying the introduction of current to the external circuits through output FET 480 and output FET 485. In an implementation, the voltage level of gate node connection 455 will eventually charge to approximately 1 volt higher than ground 410 when the enable terminal 445 is on. One of ordinary skill in the art will understand that ordinary design considerations can be used to adjust this voltage as desired.

An automatic charge 470 is also shown in FIG. 4. Charge FET 490 is attached to the gate node connection 455 at the source, and to voltage supply node 415 at the drain. Charge FET 490 can act to charge the gate node connection 455 by allowing current to flow from voltage supply node 415. Charge FET 490 can function somewhat similarly to a switch or a variable resistor with the gate providing an input which determines whether the switch is open or closed (in the case of the switch), or what the resistance will be (in the case of the variable resistor).

In an implementation, when the voltage at enable terminal 445 is high, the gate node connection 455 is at or near to the voltage of ground 410. When the voltage at enable terminal 445 is made low, initially the current through sense FET 475 is very low (at least until the charge at the gate node connection 455 charges). The voltage at trigger 495, which can correspond to the gate of sink FET 490 is therefore high, allowing current to flow to gate node connection 455 from voltage supply node 416. Voltage supply node 416 may be coupled to the same as power source as voltage supply node 415, or may be coupled to a separate power source providing substantially similar voltage. One or both of voltage supply node 415 and voltage supply node 416 may be connected to a voltage supply, a battery, a charged capacitor, or some other power source. Unlike output FET 435, charge FET 490 does not need to be limited to a certain dimension by the current mirror. Therefore, charge FET 390 can be selected with dimensions that will allow quick charge of gate node connection 455. As gate node connection 455 charges, the current allowed through sense FET 475 increases, decreasing the voltage presented to trigger 495. Thus, the current allowed through charge FET 490 will be gradually reduced, and essentially blocked as gate connection node 455 approaches full charge.

As with FIG. 3, the geometry of the various FETs shown in FIG. 4 can be selected to accommodate various circuit requirements. In an implementation, the geometries of various elements of automatic charge 470 are selected to allow the gate node connection 455 to quickly and automatically charge when the enable terminal is powered. Further, the geometries can be selected such that the voltage at trigger 495 stays at or near the voltage of ground 410 when the circuit is in steady state after power up. In this way, the current flow to gate node connection 455 from voltage supply node 416 remains off. In an implementation, this can be accomplished by sizing reference FET 465 and sense FET 475 appropriately. By way of example, reference FET 465 can be sized in reference to output FET 435, such that ratio of the width of the channel of reference FET 465 to the width of the channel of output FET 435 is 1:P. Similarly, sense FET 475 can be sized such that the ratio of the width of the channel of sense FET 475 to the width of the channel of bias FET 440 is 1:N. By keeping P greater than N, the voltage at trigger 495 will be drawn to or near to ground 410 in steady state after power up.

Figure 5:
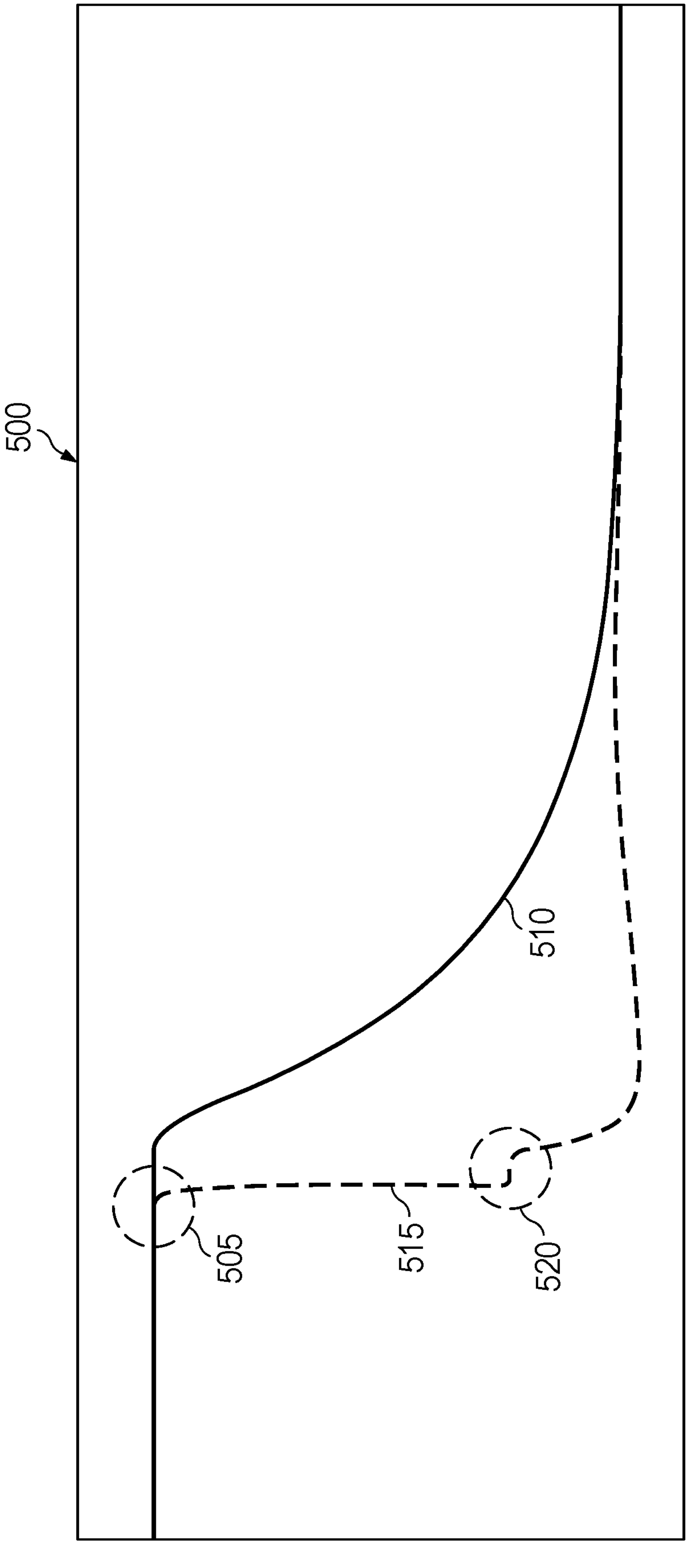
FIG. 5 is a graphical depiction of fast start-up in an implementation.

FIG. 5 demonstrates the reduced time to provide power to external circuits based on an implementation. Graph 500 shows voltage on the y-axis and time on the x-axis. At the time corresponding to point 505, enable terminal is turned on. Line 510 shows a delay before the voltage drops at all after enable terminal is turned on. After a short delay, the voltage begins to slowly drop, and eventually reaches a steady state. Line 510 illustrates a current source without an automatic charge/discharge circuit. Line 515 represents an implementation of a current source with an automatic charge/discharge circuit. Again, at point 505, enable terminal is turned on. At this point, the charge/discharge FET will automatically turn on, due to the trigger being high or low, depending on the circuit design. This causes the capacitance on the gate node connection to rapidly charge or discharge, until the voltage at the trigger changes enough to essentially shut of the current through the charge/discharge FET. This point can be seen at point 520. The remaining charge/discharge will occur through the bias FET. Notably, in the implementation, the voltage reaches desired steady-state voltage significantly faster than in the circuit without automatic charge/discharge.

As will be appreciated by one skilled in the art, aspects of the present invention may be embodied as a system, circuit, or method. Accordingly, aspects of the present invention may take the form of an entirely hardware embodiment, or an embodiment combining software and hardware aspects that may all generally be referred to herein as a "circuit," "module" or "system." Further, the terms charge and discharge when referring to a capacitor herein are used interchangeably. The use of charge or discharge is not meant to limit the description to either the addition or reduction of voltage. Rather, one of skill in the art will understand how to design a circuit such that the capacitor will appropriately add or reduce voltage to reach the desired steady state.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A power circuit comprising:
- a sense transistor comprising a first source, a first gate, and a first drain;
- a bias transistor comprising a second source, a second gate, and a second drain;
- a discharge transistor comprising a third source, a third gate, and a third drain; and
- an enable transistor comprising a fourth source and a fourth drain;

wherein:
- the first gate is coupled to the second gate, the second drain, the third source, and the fourth drain;
- the first drain is coupled to the third gate;
- the third drain is coupled to a ground node; and
- the first source, the second source, and the fourth source are coupled to a voltage supply node.

2. The power circuit of claim 1, further comprising:
- an output transistor comprising a fifth source, a fifth gate, and a fifth drain;

wherein:
- the fifth source is coupled to the voltage supply node; and
- the fifth gate is coupled to the fourth drain, the first gate, the second gate, the second drain, and the third source.

3. The power circuit of claim 2, wherein the fifth drain is connected to an external circuit.

4. The power circuit of claim 1, further comprising:
- a second bias transistor comprising a sixth gate, a sixth source, and a sixth drain;
- a reference transistor comprising a seventh gate, a seventh source, and a seventh drain;
- a second output transistor comprising an eighth gate, an eighth source, and an eighth drain;

wherein:
- the sixth drain is coupled to the sixth gate, the seventh gate, and the eighth gate;
- the seventh drain is coupled to the first drain, and the third gate; and
- the eighth drain is coupled to the first gate, the second gate, the second drain, and the third source.

5. The power circuit of claim 4, wherein the sixth source, the seventh source, and the eighth source are coupled to the ground node.

6. The power circuit of claim 4 further comprising a current source coupled to the sixth drain, the sixth gate, the seventh gate, and the eighth gate.

7. The power circuit of claim 1, wherein the sense transistor, the bias transistor, and the discharge transistor are n-type field effect transistors.

8. A power circuit comprising:
- a sense transistor comprising a first source, a first gate, and a first drain;
- a bias transistor comprising a second source, a second gate, and a second drain;
- a charge transistor comprising a third source, a third gate, and a third drain; and
- an enable transistor comprising a fourth source and a fourth drain;

wherein:
- the first gate is coupled to the second gate, the second drain, the third source, and the fourth drain;
- the first drain is coupled to the third gate;
- the third drain is coupled to a voltage supply node; and
- the first source, the second source, and the fourth source are coupled to a ground node.

9. The power circuit of claim 8, further comprising:
- an output transistor comprising a fifth source, a fifth gate, and a fifth drain;

wherein:
- the fifth source is coupled to the ground node; and
- the fifth gate is coupled to the fourth drain, the first gate, the second gate, the second drain, and the third source.

10. The power circuit of claim 9, wherein the fifth drain is connected to an external circuit.

11. The power circuit of claim 8, further comprising:
a second bias transistor comprising a sixth gate, a sixth source, and a sixth drain;
a reference transistor comprising a seventh gate, a seventh source, and a seventh drain;
a second output transistor comprising an eighth gate, an eighth source, and an eighth drain;
wherein:
the sixth drain is coupled to the sixth gate, the seventh gate, and the eighth gate;
the seventh drain is coupled to the first drain and the third gate; and
the eighth drain is coupled to the first gate, the second gate, the second drain, and the third source.

12. The power circuit of claim 11, further wherein the sixth source, the seventh source, and the eighth source are coupled to the voltage supply node.

13. The power circuit of claim 11 further comprising a current source coupled to the sixth drain, the sixth gate, the seventh gate, and the eighth gate.

14. The power circuit of claim 8, wherein the sense transistor, the bias transistor, and the charge transistor are p-type field effect transistors.

15. An integrated circuit, comprising:
a sense transistor comprising a first source, a first gate, and a first drain;
a bias transistor comprising a second source, a second gate, and a second drain; and
a charge/discharge transistor comprising a third source, a third gate, and a third drain;
an enable transistor comprising a fourth source, a fourth gate, and a fourth drain;
an output transistor comprising a fifth source, a fifth gate, and a fifth drain;
wherein:
the first gate is coupled to the second gate, the second drain, the third source, the fourth drain, and the fifth gate;
the first drain is coupled to the third gate;
the first source is coupled to the second source, the fourth source, and the fifth source; and
the fourth gate is coupled to an enable node.

16. The integrated circuit of claim 15, wherein the sense transistor, the bias transistor, the charge/discharge transistor, the enable transistor, and the output transistor are n-type field effect transistors.

17. The integrated circuit of claim 15, wherein the sense transistor, the bias transistor, the charge/discharge transistor, the enable transistor, and the output transistor are p-type field effect transistors.

18. The integrated circuit of claim 15, further comprising:
a second bias transistor comprising a sixth gate, a sixth source, and a sixth drain;
a reference transistor comprising a seventh gate, a seventh source, and a seventh drain;
a second output transistor comprising an eighth gate, an eighth source, and an eighth drain;
wherein:
the sixth drain is coupled to the sixth gate, the seventh gate, and the eighth gate;
the seventh drain is coupled to the first drain and the third gate;
the eighth drain is coupled to the first gate, the second gate, the second drain, the third source, the fourth drain, and the fifth gate; and
the sixth source is coupled to the seventh source and the eighth source.

* * * * *